US009830197B2

(12) United States Patent
Fahs et al.

(10) Patent No.: US 9,830,197 B2
(45) Date of Patent: *Nov. 28, 2017

(54) COOPERATIVE THREAD ARRAY REDUCTION AND SCAN OPERATIONS

(71) Applicant: NVIDIA CORPORATION, Santa Clara, CA (US)

(72) Inventors: Brian Fahs, Los Altos, CA (US); Ming Y Siu, Santa Clara, CA (US); Brett W. Coon, San Jose, CA (US); John R. Nickolls, Los Altos, CA (US); Lars Nyland, Carrboro, NC (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,428

(22) Filed: Aug. 16, 2016

(65) Prior Publication Data
US 2016/0357560 A1 Dec. 8, 2016

Related U.S. Application Data

(62) Division of application No. 14/025,482, filed on Sep. 12, 2013, now Pat. No. 9,417,875, which is a division (Continued)

(51) Int. Cl.
*G06F 9/30* (2006.01)
*G06F 9/52* (2006.01)
(Continued)

(52) U.S. Cl.
CPC ............ *G06F 9/522* (2013.01); *G06F 9/3004* (2013.01); *G06F 9/30087* (2013.01); (Continued)

(58) Field of Classification Search
CPC .................................. G06F 9/458; G06F 9/522
See application file for complete search history.

(56) References Cited

U.S. PATENT DOCUMENTS 5,974,524 A * 10/1999 Cheong ................... G06F 9/384
712/218
6,996,812 B2 2/2006 McKenney
(Continued)

*Primary Examiner* — Corey S Faherty
(74) *Attorney, Agent, or Firm* — Artegis Law Group, LLP

(57) ABSTRACT

One embodiment of the present invention sets forth a technique for performing aggregation operations across multiple threads that execute independently. Aggregation is specified as part of a barrier synchronization or barrier arrival instruction, where in addition to performing the barrier synchronization or arrival, the instruction aggregates (using reduction or scan operations) values supplied by each thread. When a thread executes the barrier aggregation instruction the thread contributes to a scan or reduction result, and waits to execute any more instructions until after all of the threads have executed the barrier aggregation instruction. A reduction result is communicated to each thread after all of the threads have executed the barrier aggregation instruction and a scan result is communicated to each thread as the barrier aggregation instruction is executed by the thread.

20 Claims, 9 Drawing Sheets

Related U.S. Application Data of application No. 12/890,227, filed on Sep. 24, 2010, now Pat. No. 8,539,204.

(60) Provisional application No. 61/246,045, filed on Sep. 25, 2009.

(51) Int. Cl.
 *G06F 9/38* (2006.01)
 *G06F 9/45* (2006.01)

(52) U.S. Cl.
 CPC ........ *G06F 9/30145* (2013.01); *G06F 9/3851* (2013.01); *G06F 8/458* (2013.01)

(56) References Cited

U.S. PATENT DOCUMENTS

| | | |
|---|---|---|
| 7,003,768 B2 | 2/2006 | Daynes et al. |
| 7,100,021 B1 | 8/2006 | Marshall et al. |
| 7,584,342 B1 | 9/2009 | Nordquist |
| 7,788,468 B1 | 8/2010 | Nickolls et al. |
| 8,200,947 B1 | 6/2012 | Nickolls et al. |
| 8,866,827 B2 * | 10/2014 | Zhou .................. G06F 8/31 345/522 |
| 2006/0179281 A1 | 8/2006 | Jensen et al. |
| 2006/0179284 A1 | 8/2006 | Jensen et al. |
| 2006/0218385 A1 * | 9/2006 | Smith ................ G06F 9/3806 712/238 |
| 2007/0113233 A1 | 5/2007 | Collard et al. |
| 2008/0127145 A1 | 5/2008 | So et al. |

* cited by examiner

COOPERATIVE THREAD ARRAY REDUCTION AND SCAN OPERATIONS

CROSS-REFERENCE TO RELATED APPLICATIONS

This application is a divisional application of co-pending United States application titled, "COOPERATIVE THREAD ARRAY REDUCTION AND SCAN OPERATIONS," filed on Sep. 12, 2013 and having Ser. No. 14/025,482, which is a divisional application of United States application titled, "COOPERATIVE THREAD ARRAY REDUCTION AND SCAN OPERATIONS," filed on Sep. 24, 2010 and having Ser. No. 12/890,227, now U.S. Pat. No. 8,539,204, which claims priority benefit to United States provisional patent application titled, "COOPERATIVE THREAD ARRAY REDUCTION AND SCAN OPERATIONS," filed on Sep. 25, 2009 and having Ser. No. 61/246,045. The subject matter of these related applications is hereby incorporated herein by reference.

BACKGROUND OF THE INVENTION

Field of the Invention

Embodiments of the invention relate generally to parallel thread program execution, and more specifically to performing scan and reduction operations across multiple threads.

Description of the Related Art

Conventional parallel processing architectures support execution of multiple threads. More recently, parallel processing architectures allow for parallel threads to execute independently and support the execution of specific instructions to synchronize independently executing threads. In order to perform a scan or reduction operation across the multiple threads using current systems, each thread contributes values to the scan or reduce operations by writing the values in a memory shared by the threads, then synchronizes the threads, then reads all the values written by other threads from the shared memory, then computes the scan or reduction aggregated result or receives the aggregated result. The contributing of the values by the different independently executing threads is performed serially before the threads are synchronized. The scan or reduction operation typically requires several clock cycles to complete since each thread must access a shared memory to contribute a value, synchronize (wait) for other threads, and read several values from memory to compute a final result.

Accordingly, what is needed in the art is an improved technique for performing a scan or reduction operation across multiple threads executing independently.

SUMMARY OF THE INVENTION

A system and method for performing a scan or reduction operation across multiple threads executing independently using a barrier aggregation instruction to synchronize multiple threads and perform an aggregation operation across the threads, e.g., reduction or scan. When a thread executes the barrier aggregation instruction the thread contributes to a scan or reduction result and then waits until after all of the threads have executed the barrier aggregation instruction to execute any more instructions. A reduction result is communicated to each thread after all of the threads have executed the barrier aggregation instruction and a scan result is communicated to a thread as the barrier aggregation instruction is executed by the thread.

Various embodiments of a method of the invention for performing an aggregation operation across multiple threads include receiving a barrier aggregation instruction that specifies the aggregation operation for execution by a first thread of the multiple threads and combining a value associated with the first thread with an aggregation result for the multiple threads. The aggregation result is communicated to each thread of the multiple threads. The thread waits until all of the multiple threads have received the barrier aggregation instruction before executing any more instructions.

Various embodiments of a system of the invention perform an aggregation operation across multiple threads. The system includes a barrier instruction execution unit that is configured to receive a barrier aggregation instruction that specifies the aggregation operation for execution by a first thread of the multiple threads and combine a value associated with the first thread with an aggregation result for the multiple threads. The aggregation result is communicated to each thread of the multiple threads. The thread waits until all of the multiple threads have received the barrier aggregation instruction before executing any more instructions.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
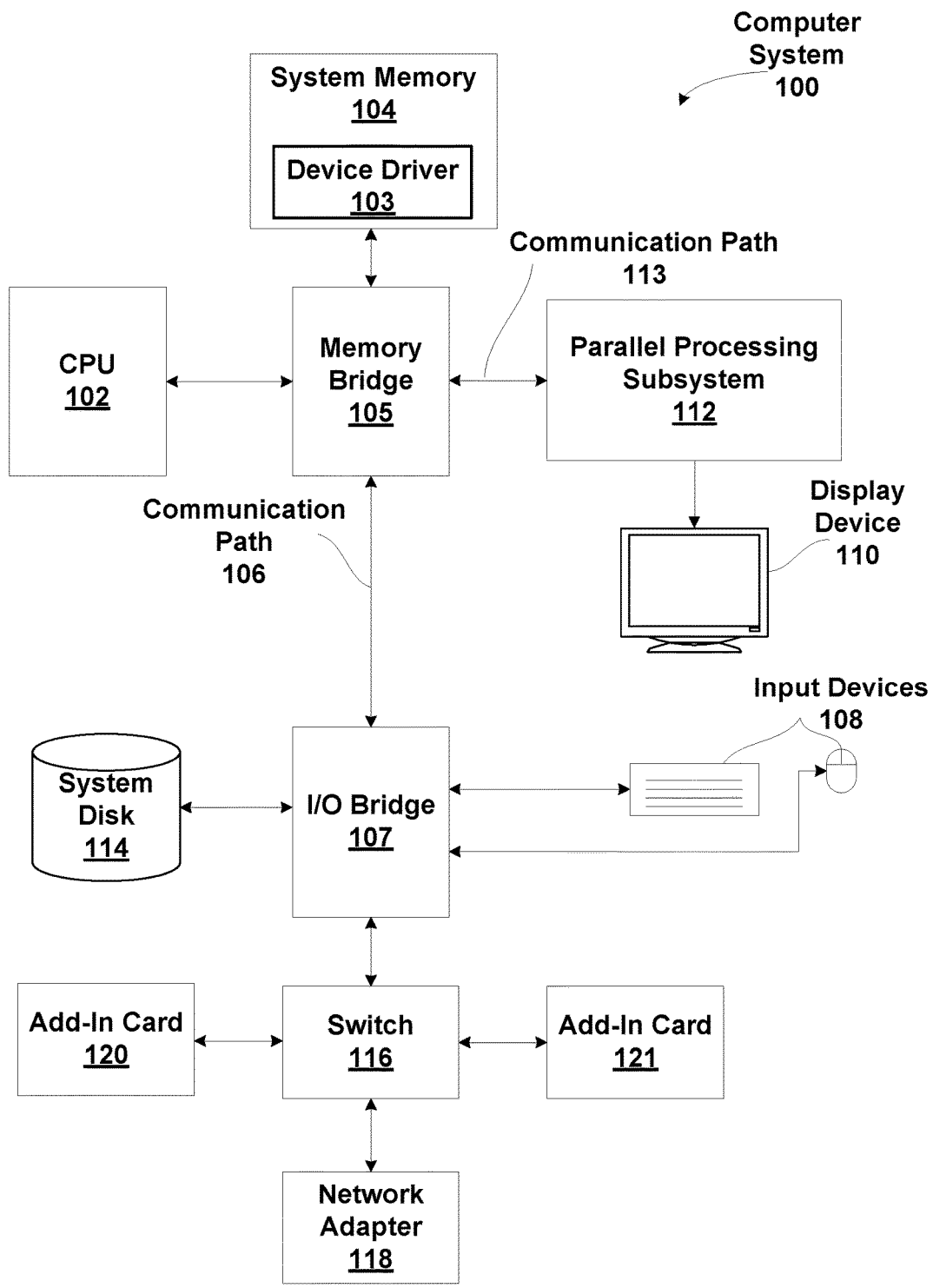
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
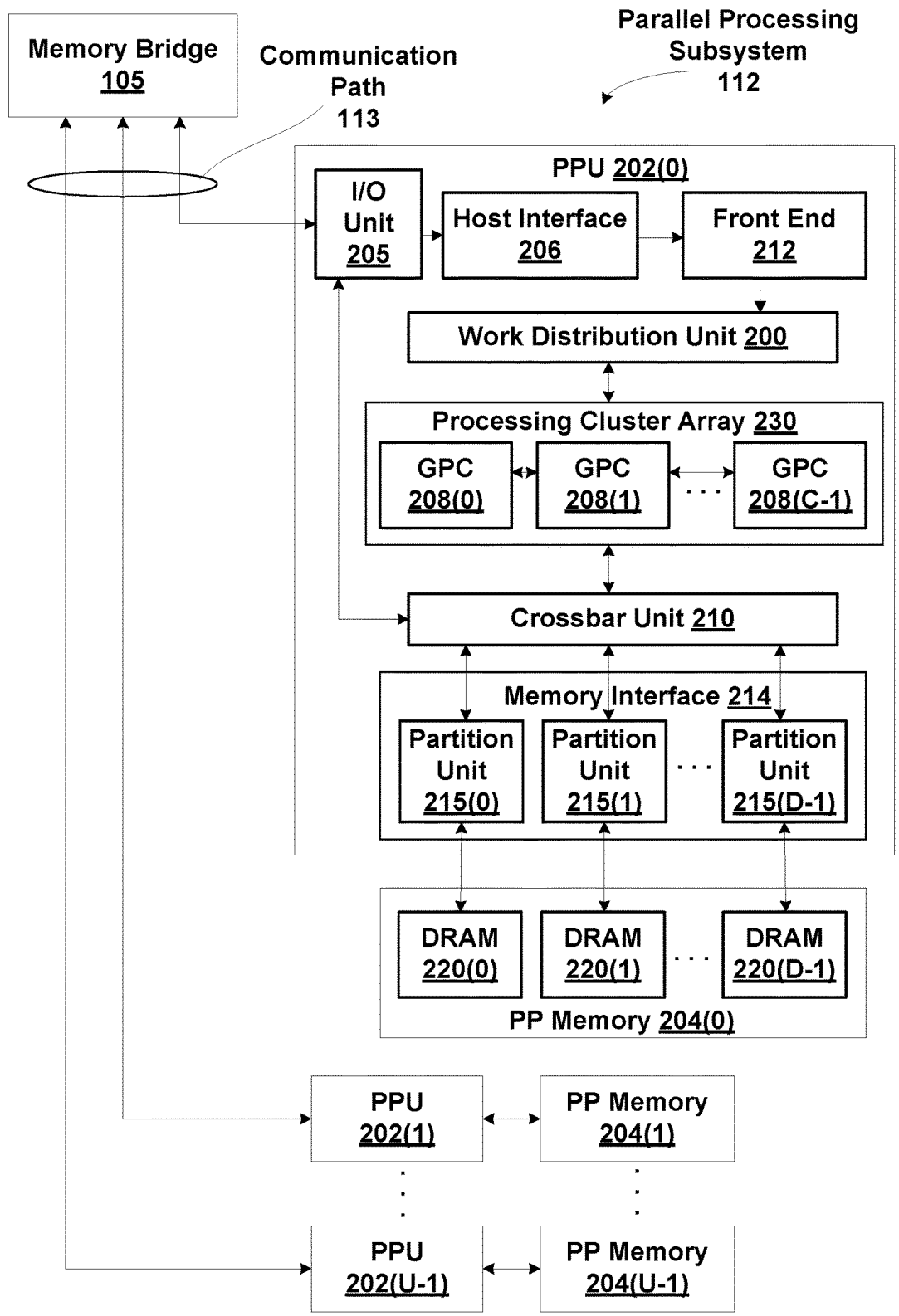
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

Memory interface 214 includes a number D of partition units 215 that are each directly coupled to a portion of parallel processing memory 204, where $D \geq 1$. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
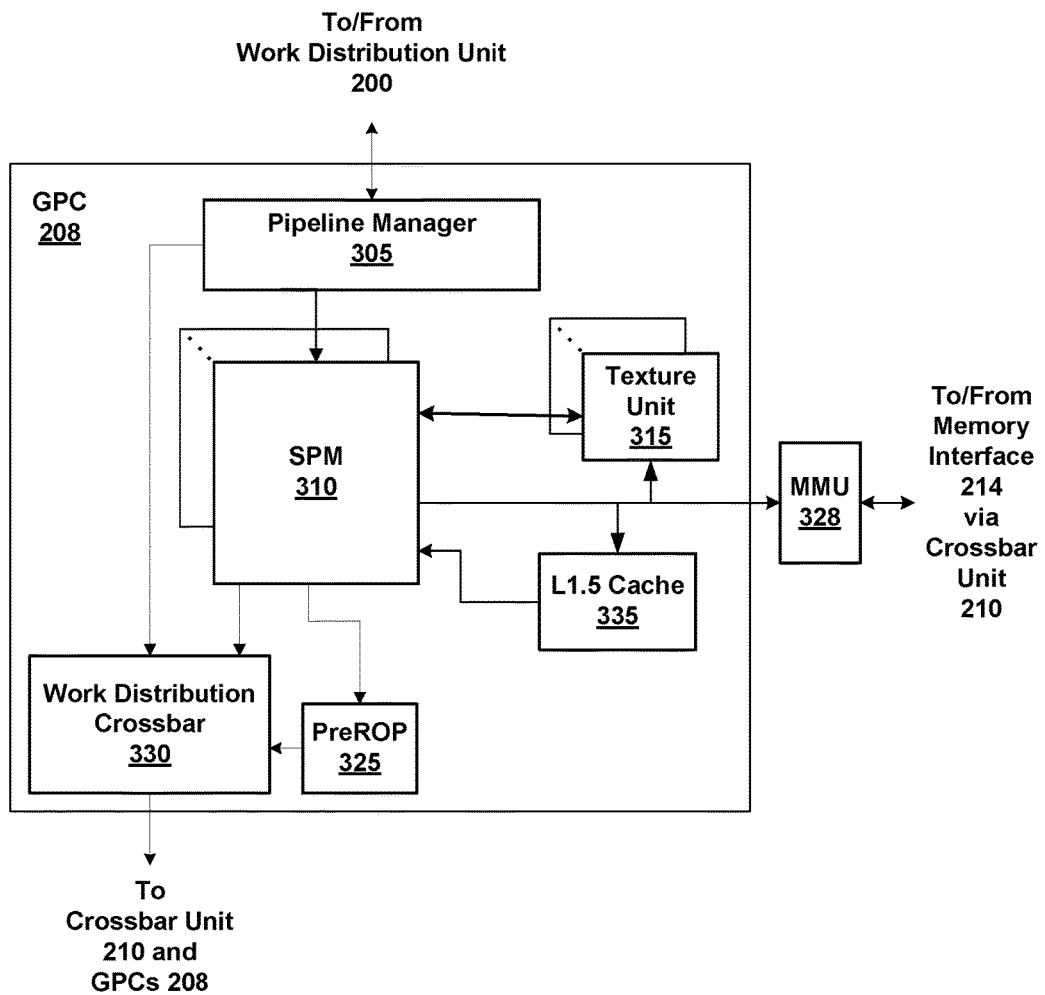
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to parallel thread processors called streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where $M \geq 1$, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 4) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
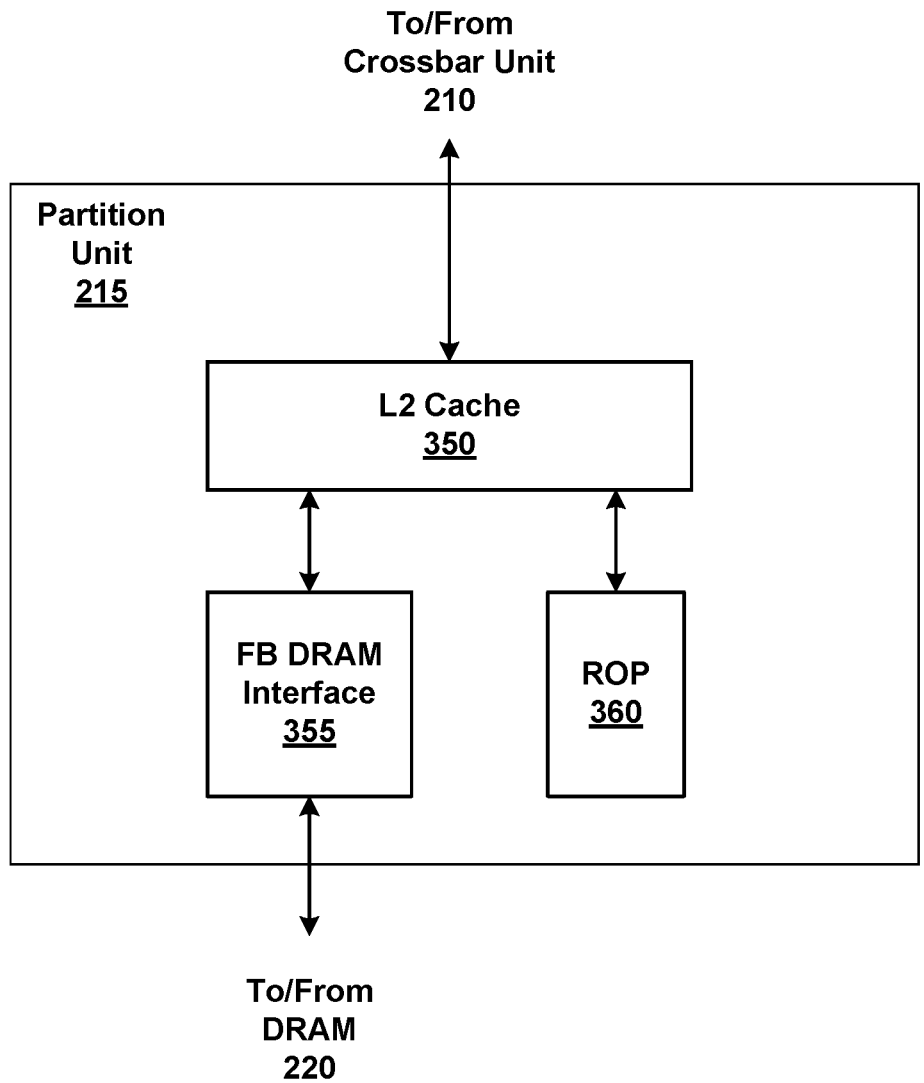
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 4:
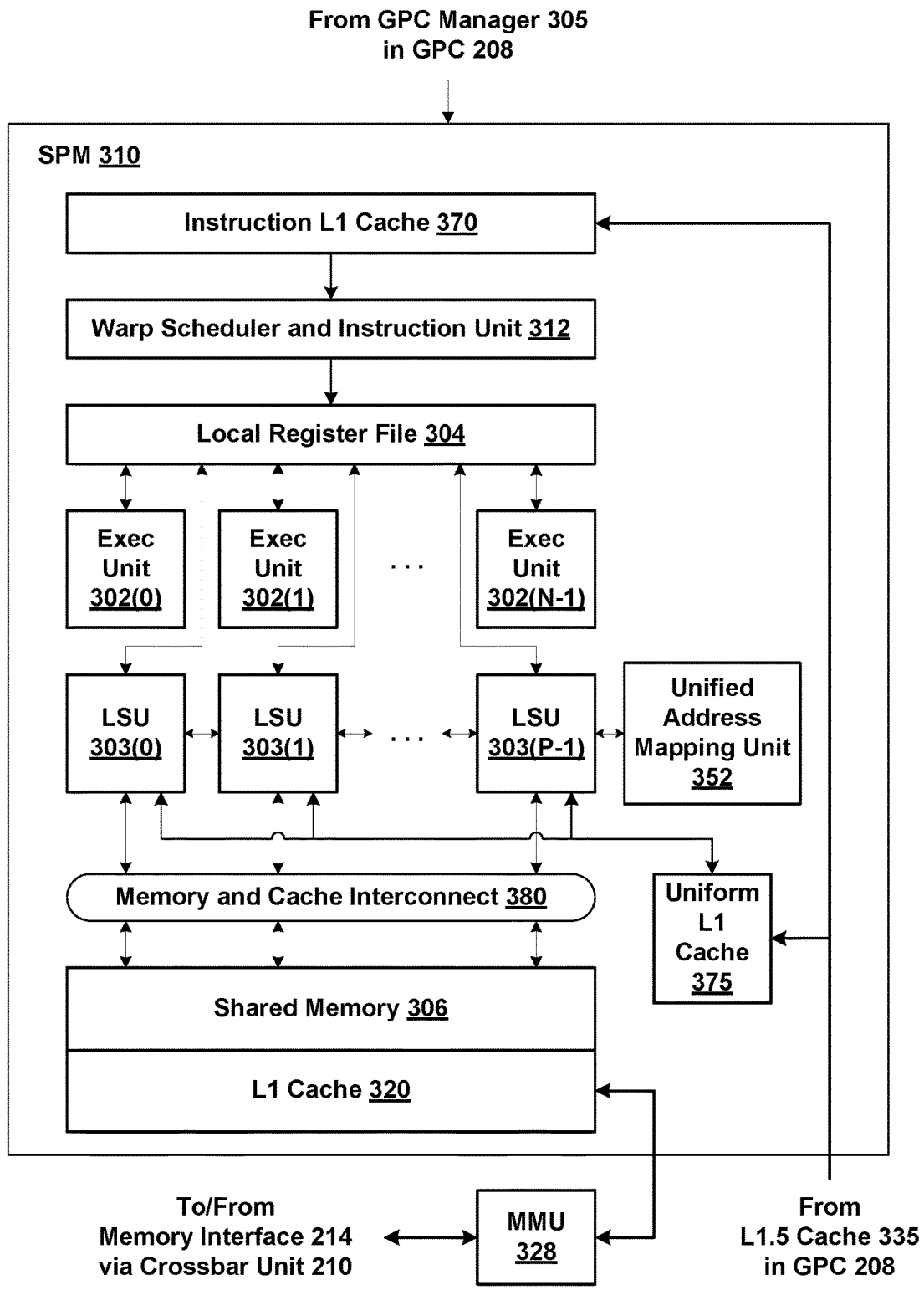
FIG. 4 is a block diagram of a portion of the SPM of FIG. 3A, according to one embodiment of the present invention.

FIG. 4 is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Thread Synchronization Across CTAs for Scan and Barrier Operations

In some embodiments of the present invention, a barrier synchronization technique is advantageously used to support fast synchronization of any number of CTA thread groups. More specifically, barrier synchronization instructions are inserted into the CTA program at points (referred to herein as "barrier synchronization points") where thread synchronization is desired. A thread executes a barrier synchronization instruction to indicate that the thread group has arrived at a barrier point and waits at that point until all other participating thread groups have also arrived at that point, thus synchronizing the participating thread groups before resuming execution of a program. A thread executes a barrier arrival instruction to indicate that the thread group has arrived at a barrier point, and continues execution without waiting.

In one embodiment, execution of barrier arrival and barrier synchronization instructions, i.e., arrival of thread groups at barrier points is detected by the warp scheduler and instruction unit 312 of FIG. 4, which can suspend the issue of instructions to any execution unit 302 allocated to execute a thread group that is waiting at a barrier point while continuing to issue instructions to other execution units 302 that are allocated to execute other thread groups that are not at a barrier synchronization point. Eventually, all participating thread groups reach the barrier synchronization point, and execution of the waiting thread group(s) resumes.

Generally, barrier instructions are executed on a per-thread group basis, as if all the threads in a thread group are active. Thus, if any thread in a thread group executes a barrier instruction, it is as if all the threads in the thread group have executed the barrier instruction. In other words, the barrier instruction applies, or not, to a thread group rather than to individual threads. This simplifies the control logic (by reducing the number of threads to be counted individually) while supporting concurrent execution of a large number of threads.

In some embodiments of the present invention, barrier instructions are extended to specify an aggregation function that performs a reduction operation or scan operation across the threads. If the barrier instruction is a barrier synchronization instruction or a barrier aggregation instruction specifying a reduction operation, then all threads in the thread group wait until the barrier instruction is executed by the other participating threads in the thread group. In one embodiment, the threads in the thread group do not wait for any of the other participating threads in the thread group. When the first thread of a particular thread group reaches the barrier instruction, an arrival count for the barrier is incremented by the thread group size, e.g., 32 threads). In conditionally executed code, a barrier instruction should only be used if it is known that all threads evaluate the condition identically (the threads within a thread group do not diverge).

Another type of barrier instruction is a barrier arrival instruction which does not cause executing thread groups to wait, but simply marks each thread group's arrival at the barrier point. A barrier aggregation instruction and a barrier arrival instruction may each specify an aggregation operation that is performed across all of the participating threads to produce an aggregate result that is communicated to each one of the participating threads.

In one embodiment, the aggregate result is a reduction or scan of (1-bit or multi-bit) values with each participating thread contributing a value. The term reduction describes the process of combining all input values into a single result that is returned to all participating threads. Examples of reduction operations include population count (i.e., sum), logical-AND, and logical-OR. The term scan describes the process of reducing input values and returning to each participating thread the current (i.e., intermediate) reduction value as the particular thread contributes its input value. Examples of scan operations include population count.

A scan operation may be used to provide the thread with the number of arrived threads (stored as the aggregate result value) and then update the aggregate result value to indicate that the thread group including the thread has arrived at the barrier instruction. A scan operation may also be used to provide a unique position for writing data to a data structure in shared memory. The unique position allows the data to be written in a packed format where the particular ordering of the threads is not controlled since the order is based on when each thread group reaches the barrier. For example, the aggregate result value may be used as an index into an array for each thread of the CTA.

Multi-bit input values per thread are input values of 32-bit floating point, unsigned, and signed inputs per thread are also within the scope of embodiments of the invention. For these multi-bit input values, the reduction operations may include addition, minimum, maximum, mul, arb, random, logical-AND, logical-OR, logical-XOR, and user-defined binary operations.

The specification of an aggregation operation may be implemented as an extension to a barrier instruction that may cause all or a subset of a CTA to synchronize at a barrier point or perform an aggregation operation at a barrier point. Embodiments of the invention extend the barrier instruction to take a 1 bit value (in the form of a predicate register) as input to the reduction or scan and add a destination register to hold the result of the reduction or scan operation. As threads execute a barrier aggregation instruction, the thread's input is combined into an aggregation result register that stores intermediate results and a final reduction or scan result. For reduction operations, the aggregation result is written to a result register for all participating threads after the final thread executes the barrier. Scan operations write the result register for each participating thread as each individual thread arrives at the barrier point, which provides participating threads with different aggregation result values.

Figure 5A:
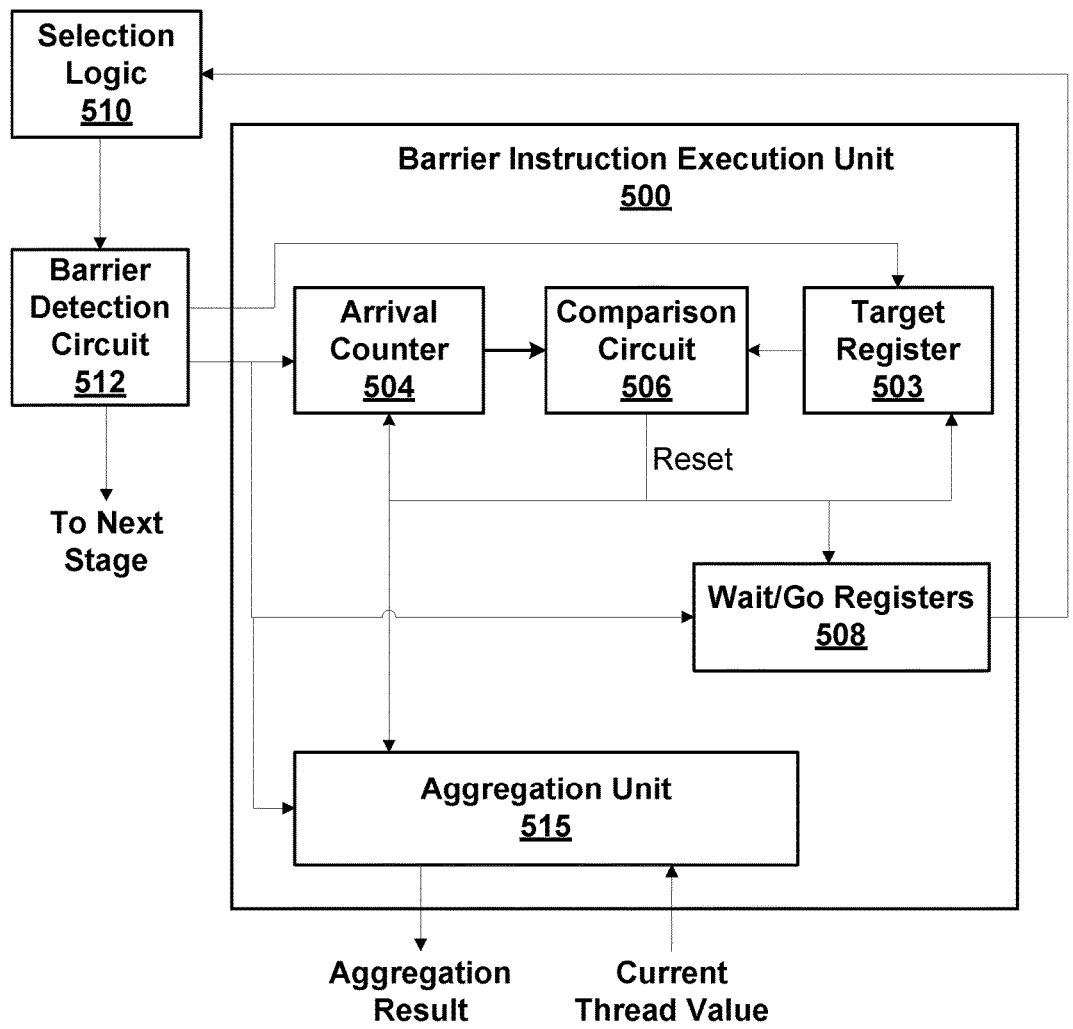
FIG. 5A is a block diagram of the barrier instruction execution unit, according to one embodiment of the present invention.

FIG. 5A is a block diagram of a barrier instruction execution unit 500, according to one embodiment of the present invention. In some embodiments the barrier instruction execution unit 500 is within the warp scheduler and instruction unit 312. As shown in FIG. 5A, the warp scheduler and instruction unit 312 also includes selection logic 510 that selects a next instruction to issue. Selection logic 510 may be of generally conventional design, and a detailed description is omitted as not being critical to understanding the present invention. Barrier detection circuit 512 receives each selected instruction. The selected instruction may be a barrier instruction that specifies a reduction or a scan operation. Barrier instructions may also receive an expected arrival count operand that defines a number of threads that participate in the barrier instruction. Barrier synchronization instructions and barrier aggregation instructions cause an executing thread to pause until an arrival counter indicates that the specified number of thread arrivals has been met for the barrier synchronization point. When zero threads are specified, it is interpreted to mean that all of the active threads participate.

When the selected instruction is a barrier instruction, barrier detection circuit 512 directs the instruction to barrier instruction execution unit 500; otherwise, barrier detection circuit 512 forwards the instruction to the next issue stage for eventual delivery to execution units 302. Barrier instruction execution unit 500 includes an arrival counter 504, a target register 503, a comparison circuit 506, wait/go registers 508, and an aggregation unit 515. The arrival counter 504 tracks the number of threads that have arrived at the barrier point. The target register 503 stores a target value which corresponds to the number threads (or thread groups) that participate in the instruction, i.e., are expected to arrive at the barrier point. In one embodiment, the target value is supplied as an immediate operand with the barrier instruction and is loaded into the target register 503 by barrier detection circuit 512 when the barrier instruction is first executed by a thread (when a barrier instruction is received and the arrival counter is zero). Once loaded, the target value advantageously remains stored in the target register 503 until the target register is reset. When the first thread participating in the barrier instruction that specifies a reduction or scan operation reaches the barrier instruction, the aggregation unit 515 and any registers storing the aggregation result value are initialized.

The comparison circuit 506 determines whether the number of arriving threads counted by the counter 504 has reached the target value stored in the target register 503. If the target value has been reached, then the comparison circuit 506 issues a reset signal to the arrival counter 504, the target register, and the wait/go registers to release the barrier.

The wait/go registers 508 keep track of which thread groups have reached the barrier point set by a barrier synchronization instruction or barrier aggregation instruction and are waiting for one or more other thread groups to synchronize at that barrier point. In one embodiment, the wait/go registers 508 are implemented using a single bit corresponding to each thread group. Each bit is set to a "wait" state (e.g., logic high) when the corresponding thread group is waiting at the barrier point to synchronize with one or more other thread groups and to a "go" state (e.g., logic low) when the corresponding thread group is not waiting at (has not yet reached) the barrier point. In response to a barrier arrival instruction for a thread group, barrier instruction execution unit 500 (or 550) increments the counter 504 (or 534) but does not set the bit corresponding to the thread group in the wait/go registers 508 (or 538) to the wait state; thus, the thread group can continue to execute.

In operation, when the barrier instruction execution unit 500 receives a first barrier aggregation instruction, the target value is loaded into the target register 503 and the aggregation unit 515 may be initialized as needed for the aggregation operation. Alternatively, the aggregation unit 515 may be initialized when the last thread participating in a barrier instruction receives the barrier aggregation instruction. The aggregation unit 515 performs the aggregation operations and updates an aggregation result value stored in the aggregation unit 515 when each thread group executes the barrier instruction.

When a reduction operation is performed the aggregation result value is broadcast to each of the participating threads when all of the threads have executed the barrier instruction and contributed to the aggregation result value. When a scan operation is performed, the aggregation result value is output to each participating thread when the thread executes the barrier instruction. For example, when a scan operation is specified with a sum function, the aggregation result value that is output is the sum of all the values for all participating threads that have executed the barrier instruction prior to the arrival of the current thread, i.e., the sum does not include the current thread's value. In one embodiment, the aggregation result value that is output does include the current thread's value.

In one embodiment, each LSU 303 combines the values for each thread in a thread group based on the aggregation operation to compute a partial aggregation result for the thread group that is provided to the aggregation unit 515. The aggregation unit 515 then combines the partial aggregation result for the thread group with the aggregation result value to compute the aggregation result value across all of the thread groups in the CTA. In one embodiment, when a barrier instruction specifying a scan operation is executed, the LSU 303 allocated to process the thread group receives the aggregation result value computed by the aggregation unit 515 from the aggregation unit 515 either before or after the partial aggregation result value is combined with the aggregation result value. In one embodiment, when a barrier instruction specifying a reduction operation is executed, each LSU 303 allocated to process a thread group in the CTA receives the aggregation result value computed by the aggregation unit 515 from the aggregation unit 515 after all of the participating threads have executed the barrier instruction.

For every first thread in a thread group that executes the barrier instruction, the counter 504 is incremented by the number of threads in a thread group. In addition, if the barrier instruction indicates that the thread group is to wait for synchronization, the bit corresponding to the thread group is set to the wait state in the wait/go registers 508. The wait/go registers 508 are advantageously read by the selection logic 510, and the selection logic 510 does not select instructions for the thread groups whose wait/go bits are in the wait state, thereby suspending execution of instructions for such thread groups. The selection logic 510 may continue to select instructions for other thread groups for execution; depending on the implementation of the selection logic 510 and the number of participating thread groups, few or no processing cycles are wasted while some thread groups are waiting at a barrier point.

The comparison circuit 506 compares the current value in the counter 504 to the target value stored in the target register 503. If the current value matches the target value, then the threads are properly synchronized and execution of any waiting threads can resume. Accordingly, the comparison circuit 506 generates a reset signal. The reset signal resets the counter 504 to zero, resets the target register 503 to an "unloaded" state (so that a new target value can be read in when the next barrier instruction is encountered), and resets the wait/go registers 508 such that the bits corresponding to all of the thread groups that were formerly waiting at the barrier point, allowing execution of those thread groups to proceed beyond the barrier point.

It will be appreciated that the barrier logic described herein is illustrative and that variations and modifications are possible. In one alternative embodiment, instead of using a counter to track the number of threads or thread groups that have arrived at a barrier point, an arrival register with one bit per thread group (or per thread) may be used. The bit for each group is set when that group arrives at the barrier point.

An AND tree or other suitable logic circuitry can be used to determine whether the desired number of thread groups have arrived at the barrier point.

Figure 5B:
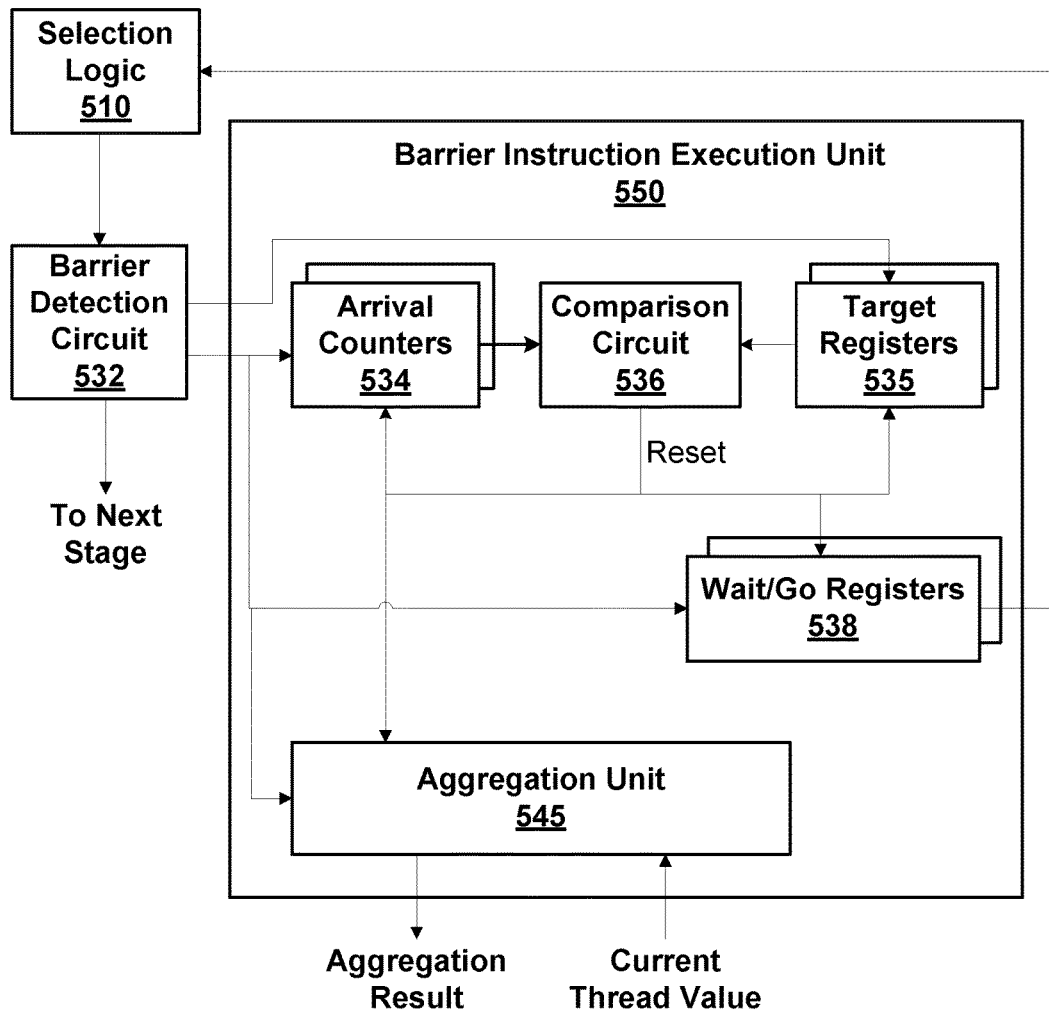
FIG. 5B is a block diagram of another barrier instruction execution unit, according to one embodiment of the present invention.

In some embodiments, the issue logic is configured to manage multiple barrier points. FIG. 5B is a block diagram of another barrier instruction execution unit 550, according to one embodiment of the present invention that manages a number B of barrier points. Each thread group may arrive and/or wait at any one of the B barrier points, and barrier instruction execution unit 550 advantageously keeps track of which thread groups are waiting at which barrier points and releases each waiting thread group at an appropriate time.

The selection logic 510 provides instructions to the barrier detection circuit 532, as described above. The barrier detection logic 532 is generally similar to the barrier detection circuit 512 described above, except that barrier detection circuit 532 also extracts a barrier identifier (BarID) from each barrier instruction. The barrier identifier BarID, which is used to distinguish different barrier points, is advantageously provided as an immediate operand or register operand with each barrier instruction.

The barrier instruction execution unit 550 includes a set of B arrival counters 534, a set of B target registers 535, an aggregation unit 545, a comparison circuit 536, and a set of wait/go registers 538. The aggregation unit 545 is generally similar to the aggregation unit 515 described above, except that the aggregation unit 545 is configured to store B aggregation result values, one aggregation result value for each of the B barrier points. The arrival counters 534 track the number of threads that have arrived at each of the B barrier points. The target registers 535 store a target value associated with each of the B barrier points; in each case, the target value corresponds to the number of thread groups that are expected to arrive at that barrier point. As in barrier instruction execution unit 500, the target value can be supplied as an immediate operand with the barrier instruction and is loaded into the appropriate target register 535 by the barrier detection circuit 532 when the first barrier instruction pertaining to a particular barrier identifier BarID is received. Each target value remains stored in a target register 535 until its barrier is reset.

The comparison circuit 536 determines whether the number of threads counted by the arrival counter 534 for any one of the B barrier points has reached the corresponding target value stored in the target register 535. If a target value is reached for a particular BarID, the comparison circuit 536 issues a reset signal to the arrival counter 534, the target register 535, and the wait/go registers 538 associated with the BarID.

The wait/go registers 538 keep track of which thread groups have reached which barrier points and are waiting for synchronization to be achieved. In one embodiment, the wait/go registers 538 include a wait/go bit and a BarID field for each of the G thread groups that can concurrently execute in the SPM 310. The wait/go bit is set to the wait state (e.g., logic high) when the corresponding thread group is waiting at one of the barrier points to synchronize with one or more other thread groups of the CTA and to the go state (e.g., logic low) when the corresponding thread group is not waiting at any barrier point. The BarID field for each thread group whose wait/go bit is in the wait state is populated with the barrier identifier of the barrier point at which the thread group is waiting.

In operation, when barrier instruction execution unit 550 receives a first barrier instruction pertaining to a barrier point BarID, the target value is loaded into the corresponding target register 535. For every barrier instruction pertaining to the barrier point BarID (including the first), the corresponding counter 534 is incremented. In addition, if the barrier instruction indicates that the thread group is to wait for synchronization, the wait/go bit corresponding to the thread group is set to the wait state in the wait/go registers 538, and the barrier identifier BarID is stored in the BarID field for that thread group. As described above, the wait/go registers 538 are advantageously read by the selection logic 510, and the selection logic 510 does not select instructions for thread groups that are in the wait state, thereby suspending execution of such thread groups. The selection logic 510 may continue to select instructions for other thread groups.

When a barrier instruction is detected, the comparison circuit 536 compares the current value in the arrival counter 534 selected by the barrier identifier BarID to the corresponding target value stored in the register 535 selected by the BarID. If the current value matches the target value for a barrier point BarID, comparison circuit 536 generates a reset signal that resets the arrival counter 534 for that barrier point to zero, resets the target register 535 for that barrier point to the unloaded state, and resets the wait/go registers 538 whose BarID fields match the BarID such that for each thread group waiting at that barrier point, the wait/go bit is in the go state. Thus, synchronization may occur at one barrier point but not all barrier points, allowing execution of some thread groups to resume while other thread groups remain suspended at a different barrier point. Further, execution for waiting thread groups can be resumed quickly (e.g., within one clock cycle) after the desired synchronization is achieved.

Any number B of barriers (e.g., 2, 4, 16, or any other number) can be supported in this manner. It should be noted that where the same issue logic is used for multiple concurrently-executing CTAs, the number of different barrier points used by each CTA may limit the number of CTAs that can concurrently execute; for example, if each CTA requires four barriers and a total of 16 barriers are supported, then no more than four CTAs would be executed concurrently.

In some instances where multiple barriers are supported, a CTA program may include instructions for selecting a barrier identifier based on the thread group ID. For instance, if at some point in a CTA program, even-numbered thread groups exchanged data with other even-numbered thread groups while odd-numbered thread groups exchange data with other odd-numbered thread groups, there would be no need to synchronize the even-numbered thread groups with the odd-numbered thread groups. To avoid unnecessary waiting in this example, even-numbered thread groups and odd-numbered thread groups may be synchronized using two different barrier points, with each thread group using its thread group ID to specify one of the two barrier points depending on whether the thread group ID is even or odd.

In some embodiments, the target value used to determine when synchronization is achieved may be specified as being equal to the total number of executing threads of the CTA, which can be dynamically determined by barrier instruction execution unit 500 or 550. Although the total number of threads in a CTA can be an input parameter, as described above, in some instances, not all threads are necessarily executing at a given time; accordingly, a dynamic determination of the total is advantageous. Specifying "all executing threads" as the target value can be done, e.g., by using a predefined special value (e.g., zero) for the argument that specifies the target value, by not specifying the argument, or by providing a separate barrier instruction that signifies the target value is "all executing threads." Where dynamic determination of the target number is used, the barrier instruction execution unit 500 or 550 advantageously recomputes the target number from time to time so that the target remains current.

As previously described, different types of barrier instructions may be defined. In general, barrier instructions signal the arrival of the executing threads at a named barrier. A barrier synchronization instruction may be defined as BAR.SYNC that is configured to receive a BarID operand and an optional target value (SbCnt) that defines the number of threads participating in the barrier. Source operand BarID may specify the barrier as a 4-bit immediate 0-15, or by register Ra that contains the number of the barrier to use. A maximum of 16 barriers can be in use by one CTA. Barriers are virtualized per CTA, i.e., a CTA's barriers are always addressed from 0 to (NumBarriersAllocated−1).

The optional SbCnt parameter SbCnt may be a register Rb or a U12 immediate value. If SbCnt is not specified or is zero, all of the threads in the CTA participate in the barrier. When execution of a barrier completes, the waiting threads are restarted without delay and the barrier is reinitialized so that it can be immediately reused.

A barrier arrival instruction may be defined as BAR.ARV that is also configured to receive a BarID operand and SbCnt. It increments the barrier arrival count and continues execution without waiting.

A barrier reduction instruction may be defined as BAR.RED.op that is also configured to receive a BarID operand and SbCnt. Like the BAR.SYNC instruction, the BAR.RED instruction causes the executing thread to wait until all or a specified number of threads in the CTA arrive at the barrier before resuming execution. BAR.RED performs predicate reduction across the threads participating in the barrier, and may be configured to count thread predicate values. To count the thread predicate values, a Pp register (or its complement) from all the threads is combined using the specified reduction operator (.op). Once the barrier count is reached, the final value is written to a register, Rd (and optionally a predicate register, Pd) in all threads executing BAR.RED and waiting at the barrier. The BAR.RED.op is configured to receive the Rd operand and the Pp complement/no complement operand. The Pd operand is optional.

The BAR.RED instruction is configured to perform counting reduction operations. Specific predicate reduction operations (.op) may include population-count (.POPC), all-threads-true (.AND), and any-threads-true (.OR). The result of .POPC is the number of threads with a true predicate, while .AND and .OR indicate if all participating threads had a true predicate or if any (1 or more) of the participating threads had a true predicate. Rd is set to 0xffff_ffff if .AND/.OR operations are true, and 0x0000_0000 otherwise. If Pd is specified, the predicate destination is set to 1 if the result is non-zero, and 0 otherwise. Other predicate reduction operations include ADD (addition), MIN (minimum), and MAX (maximum). The result of ADD is the sum of the participating thread predicate values. The result of MIN is the minimum of the participating thread predicate values. The result of MAX is the maximum of the participating thread predicate values.

The BAR.SCAN instruction is a scan operation configured to perform a prefix sum based on the thread group arrival order. BAR.SCAN may be configured to return immediately without causing the executing threads to wait (similar to BAR.ARV). In another embodiment BAR.SCAN is configured to synchronize the threads, causing the executing thread to wait until all or a specified number of threads in the CTA arrive at the barrier before resuming execution. The BAR.SCAN instruction is configured to receive the Rd operand and the Pp complement/no complement operand. The destination register, Rd is written with the sum of all the Pp predicate values for all threads that have executed the BAR instruction on this barrier (the aggregation result value may or may not include the current thread's predicate). In one embodiment, BAR.SCAN also receives the .op operand to specify a scan operation.

Barriers points continue to function properly even when some thread groups exit early. The number of live thread groups for a CTA is initialized to the total number of thread groups in the CTA when the CTA is launched. This count of live thread groups per CTA is reduced when a thread group completes execution (i.e., all threads in the thread group complete execution). Each time a CTA's live thread group count is reduced, the CTA's live thread count is compared to the current thread arrival count for barriers that are waiting on all threads to arrive (i.e., an arrival count of 0 or RZ was specified (or omitted) in the barrier instruction(s)). For those barriers that are waiting on all threads to arrive and the barrier's current thread group arrival count is greater than or equal to the CTA's number of live thread groups, the barrier is automatically released and all thread groups waiting on the barrier resume execution. If a barrier is waiting for an explicit non-zero expected arrival count, exiting thread groups have no effect on barriers or the thread groups that are waiting on barriers. Finally, when a non-zero barrier arrival count is specified, that arrival count must be met (by executing BAR instructions) or any thread groups waiting on the barrier will wait indefinitely.

The BAR.SYNC instruction may be used to cause threads of a CTA to arrive at a pre-computed barrier number and wait for pre-computed number of cooperating threads to also arrive. The code shown in TABLE 1 is an example use of the BAR.SYNC instruction, where LD is a load instruction and ST is a store instruction.

TABLE 1

| | | |
|---|---|---|
| #define CNT1 | (8 * 12) | // Number of cooperating threads |
| ST [R0 + 4], R1; | | // write my result to shared memory |
| BAR.SYNC 1, CNT1; | | // arrive, wait for others to arrive |
| LD R2, [R3 + 8]; | | // use shared memory results from other threads |

The BAR.SYNC instruction may be used to cause threads of a CTA to arrive at a pre-computed barrier number and wait for all threads in the CTA to arrive. The code shown in TABLE 2 is an example use of the BAR.SYNC instruction.

TABLE 2

| | |
|---|---|
| ST [R0 + 4], R1; | // write my result to shared memory |
| BAR.SYNC 1; | // arrive, wait for others to arrive |
| LD R2, [R3 + 8]; | // use shared memory results from other threads |

The BAR.RED.AND instruction may be used to compare values across an entire CTA. The code shown in TABLE 3 is an example use of the BAR.RED.AND instruction.

TABLE 3

| | | |
|---|---|---|
| ISETP | P0, P1, R1, R2, EQ; | // P0 is true if R1 equals R2 |
| BAR.RED.AND | R3, 1, P0; | // R3 = AND(P0 for every thread in CTA) |

The BAR.RED.POPC instruction may be used to compute the number of threads across an entire CTA that have a specific condition true. The code shown in TABLE 4 is an example use of the BAR.RED.POPC instruction.

TABLE 4

| | | |
|---|---|---|
| ISETP | P0, P1, R1, R2, EQ; | // P0 is true if R1 equals R2 |
| BAR.RED.POPC | R3, 1, P0; | // R3 = SUM(P0 for every thread in CTA) |

The BAR.SYNC instruction may be used to cause threads of a CTA to arrive at a barrier number that is not statically computable, e.g., a loop that operates n different buffers where usage of each buffer is arbitrated by is own barrier number. The code shown in TABLE 5 is an example use of the BAR.SYNC instruction.

TABLE 5

| | | |
|---|---|---|
| ST | [R0 + 4], R1; | // write my result to shared memory |
| BAR.SYNC | R1, R2; | // arrive at R1, wait for R2 threads |
| LD | R2, [R3 + 8]; | // now use the buffer |

Figure 6A:
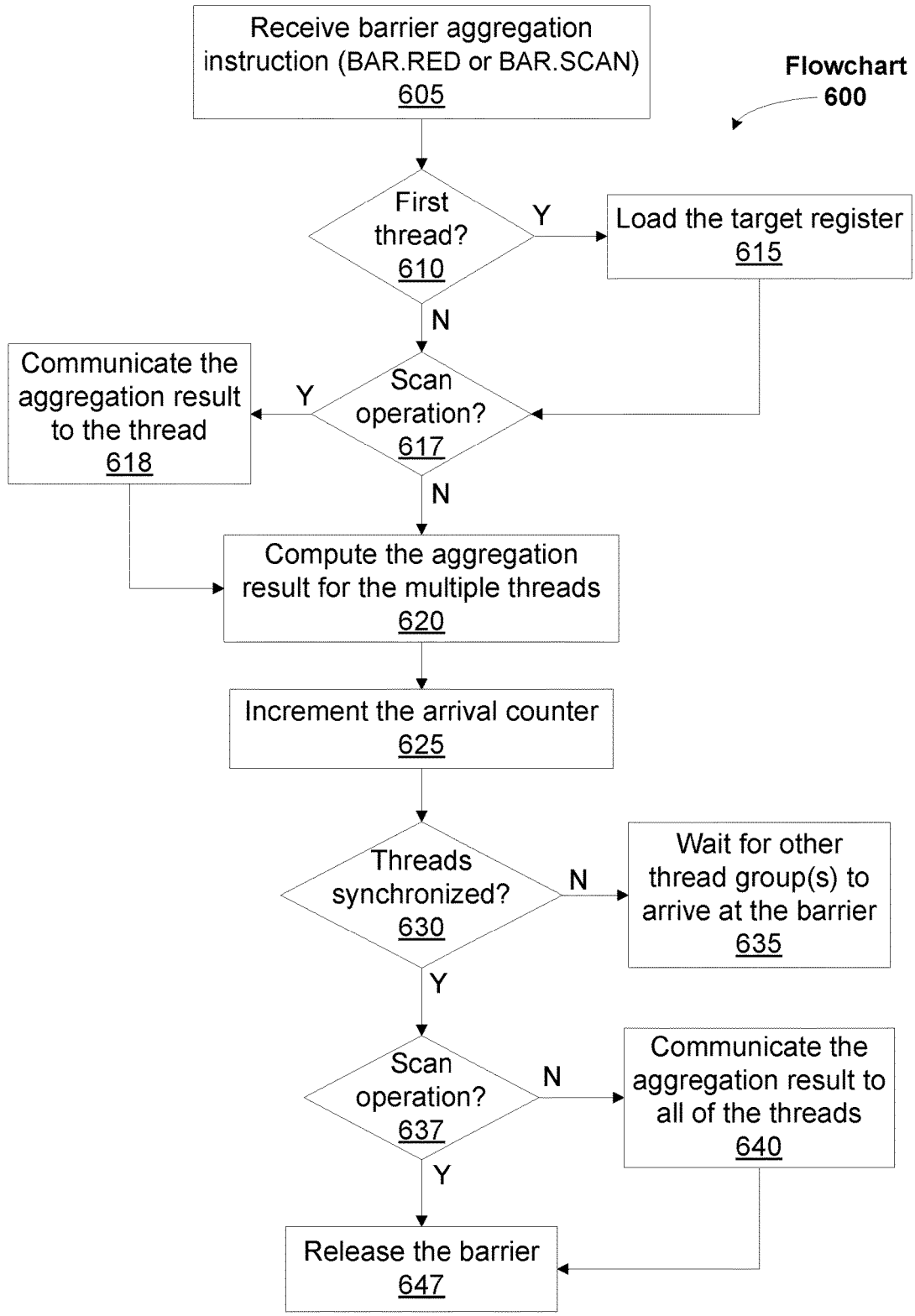
FIG. 6A is a flow diagram of method steps for executing a barrier aggregation instruction, according to one embodiment of the present invention.

FIG. 6A is a flow diagram 600 of method steps for executing a barrier aggregation instruction that specifies an aggregation operation, according to one embodiment of the present invention. At step 605 a barrier aggregation instruction that specifies an aggregation operation (BAR.RED or BAR.SCAN) is received for execution by a thread of the multiple threads in a CTA. At step 610 the barrier instruction execution unit 500 (or 550) determines if the thread is the first thread that has arrived at the barrier instruction, and if not, then the barrier instruction execution unit 500 (or 550) proceeds directly to step 617. Otherwise, at step 615 the target register 503 (or 535) is loaded with either a SbCnt value specified by the barrier instruction or with a value equal to all of the threads in the CTA. At step 615 the aggregation result value stored in the aggregation unit 515 (or 545) may also be reset. At step 617 the barrier instruction execution unit 500 determines if the barrier instruction specifies a scan operation, i.e., is a BAR.SCAN instruction, and, if not, the barrier instruction execution unit 500 (or 550) proceeds directly to step 620. Otherwise, at step 618 the barrier instruction execution unit 500 (or 550) communicates the aggregation result stored in the aggregation unit 515 to the thread before proceeding to step 620.

At step 620 the barrier instruction execution unit 500 (or 550) combines a value associated with the thread with an aggregation result to compute the aggregation result for the multiple threads. The value associated with the thread may include individual values for each thread in the thread group including the thread or the value associated with the thread may include a partial aggregation result for the thread group including the thread. At step 625 the arrival counter 504 (or 534) is incremented by the number of threads in the thread group that includes the thread. At step 630 the barrier instruction execution unit 500 (or 550) determines if all of the threads participating in the barrier are synchronized, i.e., if the arrival count equals the target value. If, at step 630 the barrier instruction execution unit 500 (or 550) determines that all of the threads participating in the barrier are not synchronized, then at step 635 execution of the barrier aggregation instruction for the thread is completed and the thread group including the thread waits for the other thread groups participating in the barrier to arrive at the barrier point before executing a next instruction.

If, at step 630 the barrier instruction execution unit 500 (or 550) determines that all of the threads participating in the barrier are synchronized, then at step 637 the barrier instruction execution unit 500 (or 550) determines if the barrier instruction specifies a scan operation, i.e., is a BAR.SCAN instruction, and, if so, the barrier instruction execution unit 500 (or 550) proceeds directly to step 647. Otherwise, at step 640 the barrier instruction execution unit 500 (or 550) communicates the aggregation result stored in the aggregation unit 515 to all of the threads participating in the barrier instruction before proceeding to step 647.

At step 647 execution of the barrier instruction has been completed by all of the threads participating in the barrier instruction, and the barrier instruction execution unit 500 (or 550) releases the barrier by resetting the wait/go registers 508 (or 538) and the arrival counter 504 (or 534). If not reset in step 617, the aggregation result value stored in the aggregation unit 515 (or 545) is also reset in step 647. Note that when the BAR.SCAN instruction is configured to communicate the aggregation result value including the thread's value, steps 617 and 618 are performed between step 620 and 630.

In general, barrier instructions that require threads to wait will tend to slow execution; accordingly, such instructions are advantageously used only to the extent that synchronization is needed in a particular CTA program. Barrier synchronization and barrier arrival instructions may be advantageously used to implement producer/consumer models with different thread groups executing different types of the barrier instruction using the same BarID and SbCnt to access a shared memory. The threads executing barrier arrival instructions (producers) announce their arrival at the barrier and continue execution without any delay to produce the next value, while the consumer threads execute the barrier synchronization instruction to wait for a resource to be produced. The roles are then reversed, using a different BarID, where the producer threads execute a barrier synchronization instruction to wait for a resource to consumed, while the consumer threads announce that the resource has been consumed with barrier arrival instruction. Care must be taken to keep a thread group from executing more BAR instructions than intended (a barrier arrival instruction followed by any other barrier instruction to the same barrier) prior to the reset of the barrier. In one embodiment, the barrier instructions are conditional, with each thread using its thread ID to determine which (if either) to execute, depending on whether the thread ID indicates that the thread is a producer or consumer.

For instance, a barrier arrival instruction may follow an instruction to write data that is to be consumed by other threads, and a corresponding barrier wait instruction may precede an instruction to read the data, thereby guaranteeing that the consumer thread reads the data only after the producer thread has written it. Similarly, a barrier arrival instruction may follow an instruction to read data produced by another thread, and a barrier wait instruction may precede an instruction to overwrite data that is intended to be read by another thread, thereby guaranteeing that the consumer thread reads the data before the producer thread overwrites it. In some algorithms, threads of a CTA are both producers and consumers of data that is communicated or shared with other threads. Such CTA programs may use barrier arrive-and-wait instructions to synchronize the threads before the threads communicate with each other or before the threads read or write data in a shared memory that could be written or read by another thread.

The BAR.SYNC and BAR.ARV instructions may be used to communicate data between a producer and consumer. The code shown in TABLE 6 is an example use of the BAR.SYNC and BAR.ARR instructions, where the first four instructions implement the consumer and the last four instructions implement the consumer.

TABLE 6 i. ST [R0], R1;        // R0 points to a shared memory location
ii. BAR.ARV 0, 64;
iii. LD R1, [R2];      // Global load
iv. BAR.SYNC 1, 64;
v. ...
vi. // Consumer code, reads from the shared memory location
vii. BAR.SYNC 0, 64;
viii. LD    R1, [R0];
ix. BAR.ARV  1, 64;
x. ...

Note that the BAR.ARV and BAR.SYNC instructions may be replaced with BAR.SCAN and BAR.RED instructions that specify aggregation operations.

Figure 6B:
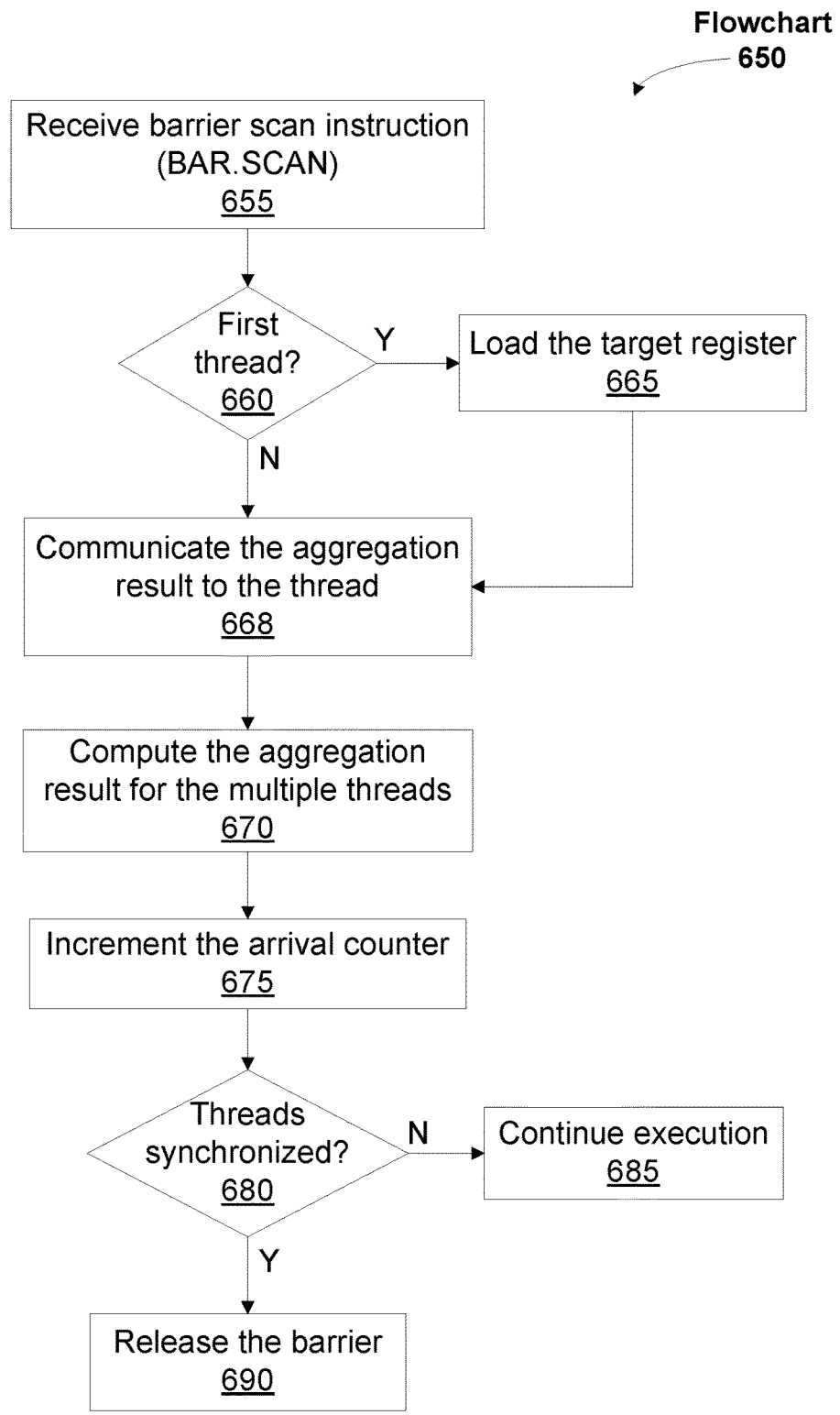
FIG. 6B is a flow diagram of method steps for executing a barrier arrival instruction that specifies a scan operation, according to one embodiment of the present invention.

FIG. 6B is a flow diagram of method steps 650 for executing a barrier scan operation, according to one embodiment of the present invention. At step 655 a barrier arrival instruction that specifies a scan operation (BAR.SCAN) is received for execution by a thread of the multiple threads in a CTA. At step 660 the barrier instruction execution unit 500 (or 550) determines if the thread is the first thread that has arrived at the barrier instruction, and, if not, then the barrier instruction execution unit 500 (or 550) proceeds directly to step 668. Otherwise, at step 665 the target register 503 (or 535) is loaded with either a SbCnt value specified by the barrier instruction or with a value equal to all of the threads in the CTA. At step 665 the aggregation result value stored in the aggregation unit 515 (or 545) may also be reset. At step 668 the barrier instruction execution unit 500 (or 550) communicates the aggregation result stored in the aggregation unit 515 to the thread before proceeding to step 670.

At step 670 the barrier instruction execution unit 500 (or 550) combines a value associated with the thread with an aggregation result to compute the aggregation result for the multiple threads. The value associated with the thread may include individual values for each thread in the thread group including the thread or the value associated with the thread may include a partial aggregation result for the thread group including the thread. At step 675 the arrival counter 504 (or 534) is incremented by the number of threads in the thread group that includes the thread. At step 680 the barrier instruction execution unit 500 (or 550) determines if all of the threads participating in the barrier have reached the barrier, i.e., if the arrival count equals the target value. If, at step 680 the barrier instruction execution unit 500 (or 550) determines that all of the threads participating in the barrier have not reached the barrier point, then at step 685 execution of the barrier arrival instruction for the thread is completed and the thread group including the thread continues execution without waiting.

If, at step 680 the barrier instruction execution unit 500 (or 550) determines that all of the threads participating in the barrier have reached the barrier, then at step 690 execution of the barrier instruction has been completed by all of the threads participating in the barrier instruction, and the barrier instruction execution unit 500 (or 550) releases the barrier by resetting the wait/go registers 508 (or 538) and the arrival counter 504 (or 534). If not reset in step 665, the aggregation result value stored in the aggregation unit 515 (or 545) is also reset in step 690. Note that when the BAR.SCAN instruction is configured to communicate the aggregation result value including the thread's value, step 668 is performed between steps 670 and 680.

Although the method steps are described in conjunction with the systems of FIGS. 1, 2, 3A, 3B, 4, 5A, and 5B, persons skilled in the art will understand that any system configured to perform the method steps, in any order, is within the scope of the inventions.

The barrier instructions may specify an aggregation operation e.g., reduction or scan, to be performed across multiple threads that execute independently. When a thread executes a barrier instruction the thread contributes to a scan or reduction result and either the intermediate aggregation result or the final aggregation result may be advantageously communicated to each one of the threads.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A subsystem for performing an aggregation operation across multiple threads, the subsystem comprising:
a barrier instruction execution unit that is configured to:
receive a barrier aggregation instruction that specifies the aggregation operation for execution by a first thread of the multiple threads;
generate an aggregation result based on the aggregation operation;
communicate the aggregation result to each thread of the multiple threads; and
waiting until each of the multiple threads has received the barrier aggregation instruction before any additional instructions are executed.

2. The subsystem of claim 1, wherein the barrier aggregation instruction specifies a number of the multiple threads that are synchronized by the barrier aggregation instruction.

3. The subsystem of claim 2, wherein each of the threads has received the barrier aggregation instruction when a count equals the number of the multiple threads specified by the barrier aggregation instruction.

4. The subsystem of claim 1, wherein the first thread is included in a first thread group, and the aggregation result is generated by combining values of each thread in the first thread group based on the aggregation operation.

5. The subsystem of claim 1, wherein the aggregation result is communicated after each of the multiple threads has received the barrier aggregation instruction.

6. The subsystem of claim 1, wherein the aggregation result is communicated to the first thread before a first value associated with the first thread is combined with the aggregation result.

7. The subsystem of claim 1, wherein the aggregation result is communicated to the first thread after a first value associated with the first thread is combined with the aggregation result.

8. The subsystem of claim 1, wherein the aggregation operation comprises a reduction function.

9. The subsystem of claim 1, wherein aggregation operation comprises a scan function.

10. The subsystem of claim 1, wherein the barrier execution unit is further configured to combine a first value associated with the first thread with the aggregation result, wherein the first value comprises more than a single bit.

11. A method for performing an aggregation operation across multiple threads, the method comprising:
    receiving a barrier aggregation instruction that specifies the aggregation operation for execution by a first thread of the multiple threads;
    generating an aggregation result based on the aggregation operation;
    communicating the aggregation result to each thread of the multiple threads; and
    waiting until each of the multiple threads has received the barrier aggregation instruction before any additional instructions are executed.

12. The method of claim 11, wherein the barrier aggregation instruction specifies a number of the multiple threads that are synchronized by the barrier aggregation instruction.

13. The method of claim 12, wherein each of the threads has received the barrier aggregation instruction when a count equals the number of the multiple threads specified by the barrier aggregation instruction.

14. The method of claim 11, wherein the first thread is included in a first thread group, and the aggregation result is generated by combining values of each thread in the first thread group based on the aggregation operation.

15. The method of claim 11, wherein the aggregation result is communicated after each of the multiple threads has received the barrier aggregation instruction.

16. The method of claim 11, wherein the aggregation result is communicated to the first thread before a first value associated with the first thread is combined with the aggregation result.

17. The method of claim 11, wherein the aggregation result is communicated to the first thread after a first value associated with the first thread is combined with the aggregation result.

18. The method of claim 11, wherein the aggregation operation comprises a reduction function.

19. The method of claim 11, wherein aggregation operation comprises a scan function.

20. The method of claim 11, further comprising combining a first value associated with the first thread with the aggregation result, wherein the first value comprises more than a single bit.

* * * * *